G. H. GLOVER.
POISONOUS VAPOR GENERATOR FOR AEROPLANES.
APPLICATION FILED JUNE 18, 1918.

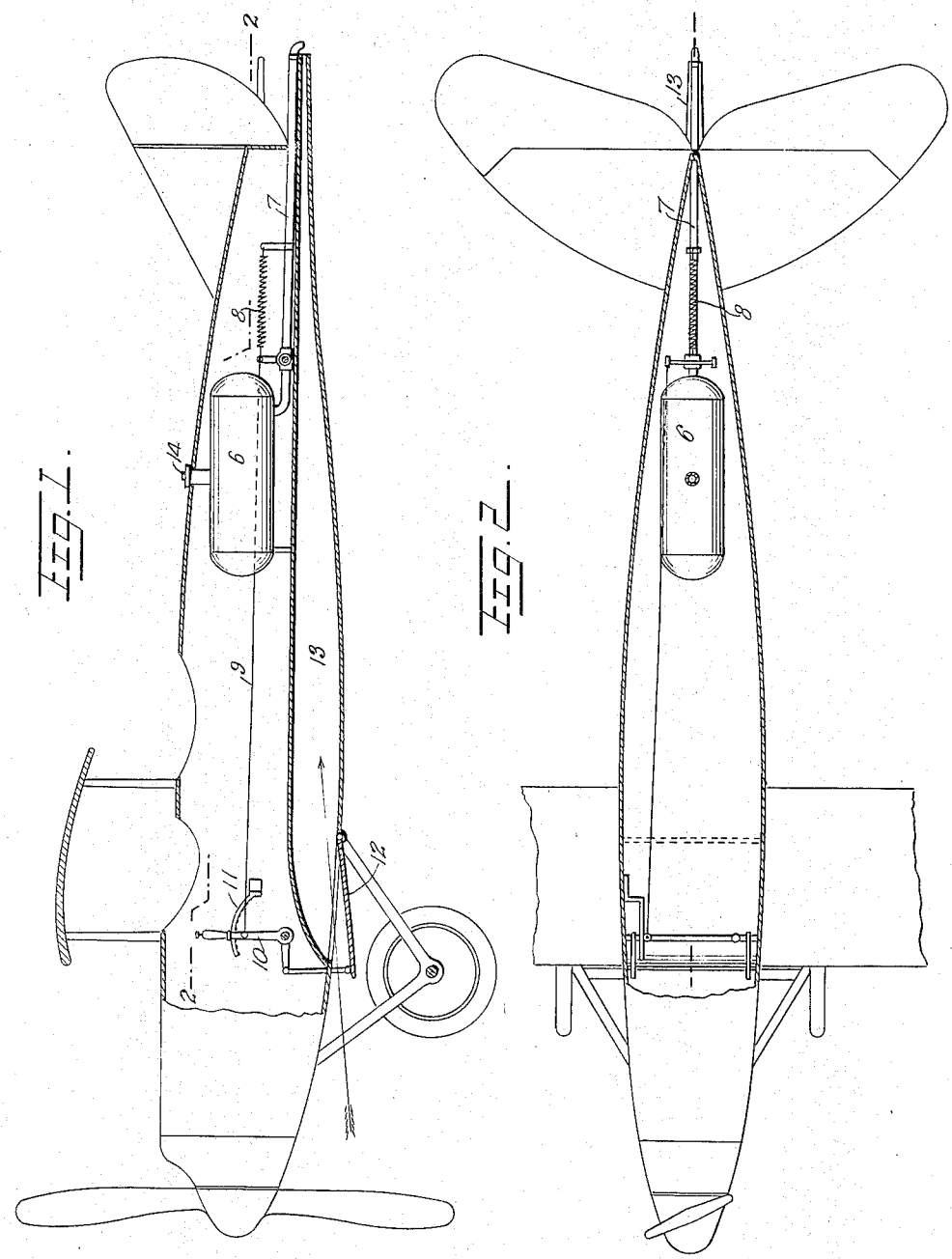

1,300,160.

Patented Apr. 8, 1919.
2 SHEETS—SHEET 2.

WITNESSES
H. T. Walker
B. Joffe

INVENTOR
G. H. Glover
BY
ATTORNEYS

UNITED STATES PATENT OFFICE.

GEORGE HORTON GLOVER, OF SHORT HILLS, NEW JERSEY, ASSIGNOR TO HARRIET PHELPS GLOVER, OF SHORT HILLS, NEW JERSEY.

POISONOUS-VAPOR GENERATOR FOR AEROPLANES.

1,300,160.　　　　　Specification of Letters Patent.　　Patented Apr. 8, 1919.

Application filed June 18, 1918. Serial No. 240,691.

*To all whom it may concern:*

Be it known that I, GEORGE HORTON GLOVER, a citizen of the United States, and a resident of Short Hills, county of Essex, and State of New Jersey, have invented Poisonous - Vapor Generators for Aeroplanes, of which the following is a full, clear, and exact description.

My invention relates to attachments for aeroplanes whereby poisonous vapors may be generated in such a way that they will not affect persons occupying the aeroplane, while leaving behind a poisonous atmosphere.

An object of the invention is to provide a simple, inexpensive and efficient attachment which can be easily controlled by the pilot and which attachment is adapted to utilize the air current created by the speed of the machine in flight.

With the above and other objects in view, the nature of which will more fully appear as the description proceeds, the invention consists in the novel construction, combination and arrangement of parts as herein described, illustrated and claimed.

In the accompanying drawings, forming a part of the application, similar characters of reference indicate corresponding parts in all the views.

Figure 1 is a diagrammatic, part elevation, part section of an aeroplane equipped with an attachment embodying my invention, the attachment being shown in heavier lines than the machine;

Fig. 2 is a section on line 2—2, Fig. 1;

Figure 3:
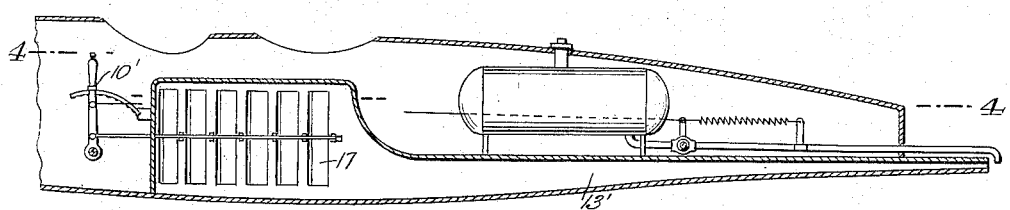
Fig. 3 is a fragmentary section through an aeroplane showing a modified arrangement of the air supply control.

Referring to Figs. 1 and 2, 6 is a tank for poisonous solutions, such for example, as will produce paralysis or unconsciousness, *e. g.* cyanid of cacodyl dissolved to saturation in ether or alcohol. The tank has preferably rounded surfaces all over to render it immune to some extent to the machine gun bullets. It is preferably located near the rear end of the machine and has a valve-controlling conduit 7 extending beyond the rudder and preferably below. The conduit is so situated that the liquid is fed gravitationally thereto. The valve is normally maintained in closed position by a yielding member 8. The valve is also connected by a control wire 9 to a hand lever 10 located in proximity to the pilot's seat, a suitable notched quadrant 11 is provided for the lever 10 so that any desired amount of liquid can be allowed to escape through the conduit 7.

The lever 10 also controls a shutter 12 hinged to form a baffle to direct the air into a bottom passage 13 when the machine flies. The passage 13 is formed in the bottom of the aeroplane and cross section decreases as it approaches the rear of the machine so that the velocity of the air in the passage 13 increases as it approaches the end of the conduit 7 which is adapted to discharge across the end of said passage 13. The liquid coming from the tank across the rear end of the passage 13 is atomized by the air coming from the passage 13 and distributed into the surrounding atmosphere.

To allow the free flow of the liquid from the tank the filling plug 14 of same is provided with an air vent 15, normally closed by a valve 16, which valve is adapted to open the vent 15 when the valve of the conduit 7 is open.

Figure 4:
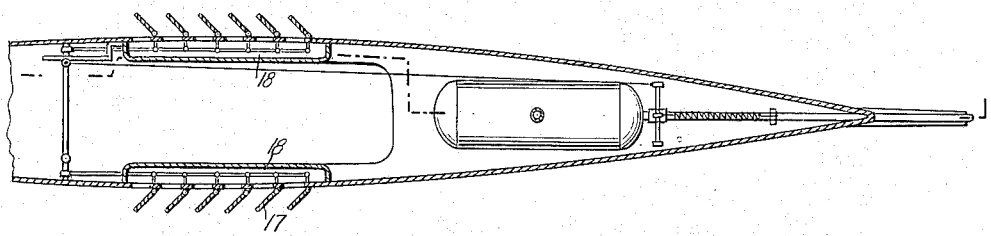
Fig. 4 is a horizontal section on line 4—4, Fig. 3.
Figure 5:
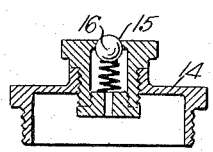
Fig. 5 is a cross section through the filling plug of the tank.

In Figs. 3 and 4 the lever 10' controls side shutters which when thrown open swing from the side of the aeroplane forming baffles for directing the air into the side pockets 18 when the machine is flying. The side pockets may enter a bottom passage 13 as shown, or side passages may be formed through the entire length of the machine which then will merge into a passage below the liquid-delivering conduit, as previously described.

It will be noted that the liquid and the air supply are controlled simultaneously. This synchronized delivery is preferred so as to prevent too great a supply of air with a too little supply of liquid, or vice versa.

By flying low over the enemy positions the emitted vapor by virtue of its weight, and not being diluted to the same extent as gas, falls in a concentrated form on the ground passed over by the aeroplane. In cases when attacked by a speedier machine, which machine is maneuvering to get the stern position (the blind spot) of the aeroplane equipped with the vaporizer, the enemy would place himself in the vaporizer atmosphere by the time he is within machine gun range, for the tendency of the vapor is to hang and not to diffuse as easily as gas. The vaporizer being situated in the rear, that is, aft of the elevators and rudder, the vaporized atmosphere will not come into contact with any part of the machine and in consequence will not affect the occupants while flying, or when working on the plane.

I claim,—

1. In combination with an aeroplane having a passage terminating at the tail end of the aeroplane, of means for supplying a liquid to the tail end of the passage to be atomized by a fluid directed through said passage.

2. In combination with an aeroplane having a passage terminating at the tail end of the aeroplane said passage being disposed to scoop air as the aeroplane travels, of means for supplying a liquid to the tail end of the passage whereby said liquid may be atomized by the air flowing through said passage.

3. In combination with an aeroplane having a passage terminating at the tail end said passage being disposed to scoop air as the aeroplane travels, and means for controlling the inlet of the air into the passage, of means for supplying a liquid to the tail end of the passage whereby said liquid may be atomized by the air escaping from the passage.

4. In combination with an aeroplane having an air passage terminating at the tail end of the aeroplane, means controlling the other end of the passage adapted to facilitate the inflow of air into said passage when the aeroplane travels, and means for operating said controlling means, of means for supplying liquid to the tail end of the passage whereby said liquid may be vaporized by the air issuing from said passage said means for supplying liquid being also controlled from the operating means.

5. In combination with an aeroplane having a passage terminating at the tail end of the aeroplane, a shutter for the other end of the plane, and means for operating the shutter, said shutter being so disposed as to facilitate the scooping of air into the passage when the aeroplane travels, of a tank, a conduit from the tank to the tail end of the passage, a valve on the said conduit, said valve having means normally tending to close the valve, and means connecting the valve to the means for operating the shutter whereby said shutter and valve are operated simultaneously.

6. In combination with an aeroplane having a passage terminating at the tail end of the aeroplane, and a shutter for the other end of the passage, of a tank having a conduit leading to the tail end of the passage, and means for simultaneously operating the shutter and the outflow from said tank to the tail end of the passage.

GEORGE HORTON GLOVER.